United States Patent [19]
Fothergill et al.

[11] 3,718,918
[45] Feb. 27, 1973

[54] NUCLEAR EXPLOSION DETECTION SYSTEMS

[75] Inventors: Reginald Allan Fothergill; Reginald Frank Charles Bennett, both of Basingstoke; Gerald Thomas Risley, Thatcham; William Stanley Weeks, Tadley, all of England

[73] Assignee: United Kingdom Atomic Energy Authority, London, England

[22] Filed: Dec. 1, 1969

[21] Appl. No.: 881,129

[52] U.S. Cl. ..........340/213 R, 250/83.3 R, 328/112, 328/114, 340/228 R
[51] Int. Cl. ............................................G08b 21/00
[58] Field of Search.....340/213, 228, 213 R; 250/83, 250/83.3, 83.3 H; 328/112, 114, 132

[56] References Cited

UNITED STATES PATENTS

| | | | |
|---|---|---|---|
| 3,524,984 | 8/1970 | Fothergill et al. | 250/83.3 R |
| 3,138,759 | 6/1964 | Thompson | 328/112 |
| 3,147,380 | 9/1964 | Buckingham et al. | 250/83.3 H |
| 3,281,811 | 10/1966 | Cotterman et al. | 340/214 |
| 3,467,826 | 9/1969 | Cotterman | 250/83.3 |
| 3,421,021 | 1/1969 | Britt | 328/112 X |

*Primary Examiner*—David L. Trafton
*Attorney*—Larson, Taylor & Hinds

[57] ABSTRACT

This nuclear explosion detection system receives the radiated transient radiofrequency signal and the fast-rising and slow-rising portions of the radiated transient optical signal, and indicates the occurrence of an explosion only if these signals satisfy selected criteria. The optical criteria include the relative durations of different parts of the optical signal and are checked by deriving time-intervals which include multiples of the durations of given parts of the optical signal, these derived time-intervals being compared with the durations of other parts. The time-intervals are derived by feeding clock pulses at suitable repetition frequencies to reversible counters in one direction during the given parts of the signal, and subsequently feeding clock pulses at appropriate submultiples of those repetition frequencies to the counters in the reverse direction to return them to predetermined conditions.

17 Claims, 6 Drawing Figures

PATENTED FEB 27 1973 3,718,918

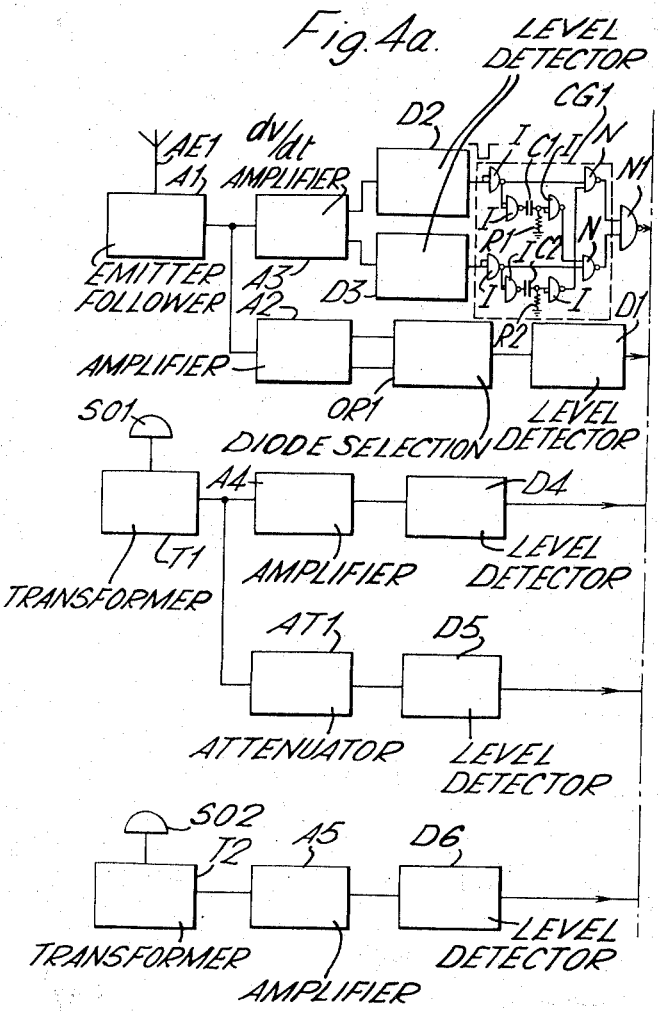

NUCLEAR EXPLOSION DETECTION SYSTEMS

BACKGROUND OF THE INVENTION

This invention relates to nuclear explosion detection systems for explosions taking place at or above ground level.

In our copending application Ser. No. 633,568, filed on Apr. 25, 1967 and now U.S. Pat. No. 3,524,984 there is described and claimed a detection system which receives the transient radiofrequency signal and the fast - and slow-rising portions of the transient optical signal radiated from a nuclear explosion, and generates three corresponding output pulses only if these signals meet specified rate-of-rise duration and amplitude criteria. These pulses, if generated, are combined to give an output only if they occur in a specified time-sequence. The occurrence of this output indicates a nuclear explosion and not, for example, a lightning flash. Additionally, the yield of the explosion may be measured as the time to the start of the slow-rising portion.

The present invention provides an improved system which enables the range of detection to be extended to lower yields (which may be below 1 kiloton under suitable conditions), and the chance of false alarms due to e.g. lightning to be reduced.

SUMMARY OF THE INVENTION

The present invention provides a nuclear explosion detection system including means for receiving the radiated transient optical signal, and means whereby the occurrence of an explosion cannot be indicated unless said signal satisfies selected criteria, wherein said system comprises means for comparing the duration of a part of the optical signal with the duration of another part of the optical signal.

The system may comprise means for deriving at least one time-interval which includes a multiple of the duration of a given part of the optical signal, and means for comparing the duration of another part of the optical signal with said time-interval.

The system may also include means for receiving the radiated transient radiofrequency signal and means whereby the occurrence of an explosion cannot be indicated unless the radiofrequency signal and the optical signal satisfy selected criteria. The system may comprise means for receiving both the fast-rising and the slow-rising portions of the optical signal and means for indicating the occurrence of an explosion if said radiofrequency signal and both said optical portions satisfy selected criteria.

The time-interval deriving means may be arranged to derive a first time-interval which includes a multiple of the time to the first optical maximum, and a second time-interval which includes a multiple of the time to the first optical minimum, the comparing means being arranged to compare the time to the first optical minimum with said first derived time-interval and to compare the time between the first optical minimum and the second optical maximum with said second derived time-interval. The first time-interval may also include a fixed time.

The system may be arranged so that an explosion cannot be indicated unless the time to the first optical minimum is less than said first time-interval, and may be further arranged so that an explosion cannot be indicated unless the time between the first optical minimum and the second optical maximum exceeds said second derived time-interval or a fixed time, whichever is the lesser.

As a substitute for, or in addition to, deriving said second time-interval and comparing it with the time between the first optical minimum and the second optical maximum, the system may comprise means for deriving a further time-interval which includes a multiple of the time to the first optical maximum, means for comparing said further time-interval with the time to the first optical minimum, and means whereby an explosion cannot be indicated unless the time to the first optical minimum exceeds said further time-interval. Where such means are substituted, it is unnecessary to provide means for receiving the slow-rising portion of the optical pulse.

One form of nuclear explosion detection system according to the present invention comprises means for receiving the transient radiofrequency signal radiated from the explosion, means for deriving from said radiofrequency signal a first output pulse if its rate of rise exceeds a predetermined value, its duration is less than a predetermined time and its field-strength exceeds a predetermined level, means for receiving the fast- and slow-rising portions of the transient optical signal radiated from the explosion and converting them to electrical signals, means for deriving from said fast-rising portion a second output pulse if its rate of rise exceeds a first predetermined value, means for deriving from said slow-rising portion a third output pulse if its rate of rise exceeds a predetermined value, and means for causing the occurrence of said first, second and third output pulses to indicate a nuclear explosion provided that:

a. said second pulse occurs within a predetermined time of said first pulse,
b. said second pulse does not exceed a predetermined duration unless the rate of rise exceeds a second rate of rise greater than said first rate of rise,
c. said third pulse commences more than a predetermined time after the end of said second pulse but less than a time thereafter which exceeds the duration of said second pulse,
d. said third pulse has a duration which exceeds the time between the end of the second pulse and the commencement of the third pulse.

In (c) above, the time thereafter may be a function comprising a multiple of the duration of said second pulse; this function may also include a fixed time.

In (d) above, the duration may exceed either a time which is a function comprising a multiple of the time between the end of the second and the commencement of the third pulse or a predetermined time, whichever is the lesser.

Additionally, it may be arranged that the first output pulse is only derived if said predetermined field strength level is reached within a predetermined time of the predetermined rate of rise and duration.

The times which are multiples of given pulse or part-pulse durations may be derived by feeding clock pulses at one repetition frequency to a reversible counter during the given duration in one direction, and subsequently feeding clock pulses at a sub-multiple of said repetition frequency to the counter in the reverse direction to return the counter to a predetermined condition.

DESCRIPTION OF THE DRAWINGS

To enable the nature of the present invention to be more readily understood, attention is directed by way of example to the accompanying drawings wherein

FIGS. 4a, 4b and 4c are block schematic circuit diagrams of the embodiment whose logic criteria are shown in FIG. 3.

The radiofrequency transient radiated by a nuclear explosion and detectable by an aerial can take complex forms, but as is known, all include a front edge representing a rapid change of field strength, of either polarity. FIG. 1 shows such a front edge. In the embodiment to be described, this front edge must satisfy the following criteria to be characteristic of a nuclear explosion, viz. (capital letters refer to FIG. 1)

a. Peak field strength (A) > ±3V/meter.
b. Rate of rise of field strength (B) > 5V/m/$\mu$sec
c. Duration of rate of rise (B) < 2.5$\mu$sec.
d. The specified peak field strength (a) must be reached within 2.5$\mu$sec of the occurrence of the rate of rise of field strength having value (b) and duration (c)

Figure 1:
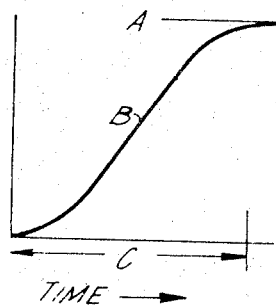
FIG. 1 is a graph of the front edge of a form of radiofrequency transient radiated by a nuclear explosion as received at a distance, on a linear time-scale.
Figure 2:
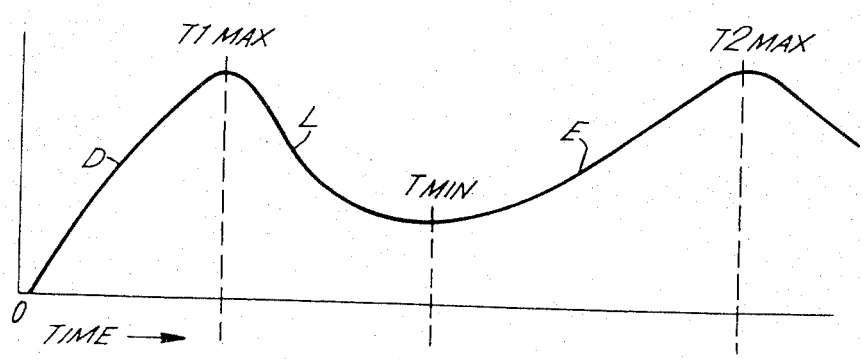
FIG. 2 is a graph of the form of optical transient radiated by such an explosion, on a quasi-logarithmic time-scale.

The optical transient radiated by a nuclear explosion and dedectable by a photo-cell is represented in FIG. 2 and is also known.

The time-intervals in FIG. 2 are in the following approximate ratios:

$$0 \rightarrow T1_{MAX} : T1_{MAX} \rightarrow T_{MIN} : T_{MIN} \rightarrow T2_{MAX}$$
$$1 \quad : \quad 100 \quad : \quad 1000$$

$T1$MAX, $T$MIN and $T2$MAX are commonly termed the first maximum, first minimum and second maximum respectively.

Typical approximate values for different yields are:

| 1 kT | 40$\mu$sec | 4.5 msec | 32 msec |
|---|---|---|---|
| 1 OMT | 4 msec | 250 msec | 3200 msec |
| 30MT | 7 msec | 410 msec | 5500 msec |

The time to $T$MIN is the most consistent value and can be used to measure the yield.

Figure 3:
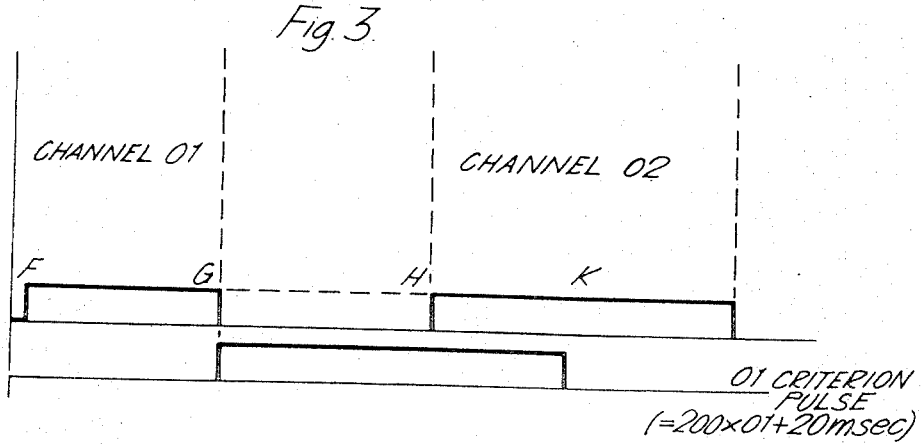
FIG. 3 is a diagram illustrating optical logic criteria in an embodiment of the present invention.

In the present invention there is derived from the fast-rising portion, terminating at $T1$MAX, a pulse termed the 01 pulse; from the slow-rising portion, beginning at $T$MIN and ending at $T2$MAX, there is derived a pulse termed the 02 pulse. In the present embodiment the rates of rise of the fast- and slow-rising portions, indicated at D and E respectively, must exceed minimum values to generate these pulses, whose duration is equal to the time for which they are exceeded. These durations, and the pulse sequence, are indicated in FIG. 3 where, F = 01 pulse front edge
G = 01 pulse back edge ($T1$MAX)
H = 01 pulse front edge ($T$MIN)
K = 02 pulse minimum rate of rise persisting.

In the present embodiment the criteria which must be satisfied to characterize a nuclear explosion are as follows:

i. F must occur and be maintained within 200 $\mu$ sec of the radiofrequency transient criteria set out above.
ii. F-G duration must not exceed 6.3 msec unless rate of rise of fast portion of optical transient exceeds a predetermined high value
iii. H must occur >1 msec after G but <(20 msec + 200 × F-G duration) after G.
iv. K must persist for >3 × F-H duration or >384 msec, whichever is the lesser.

DESCRIPTION OF THE PREFERRED EMBODIMENT

Figure 4B:
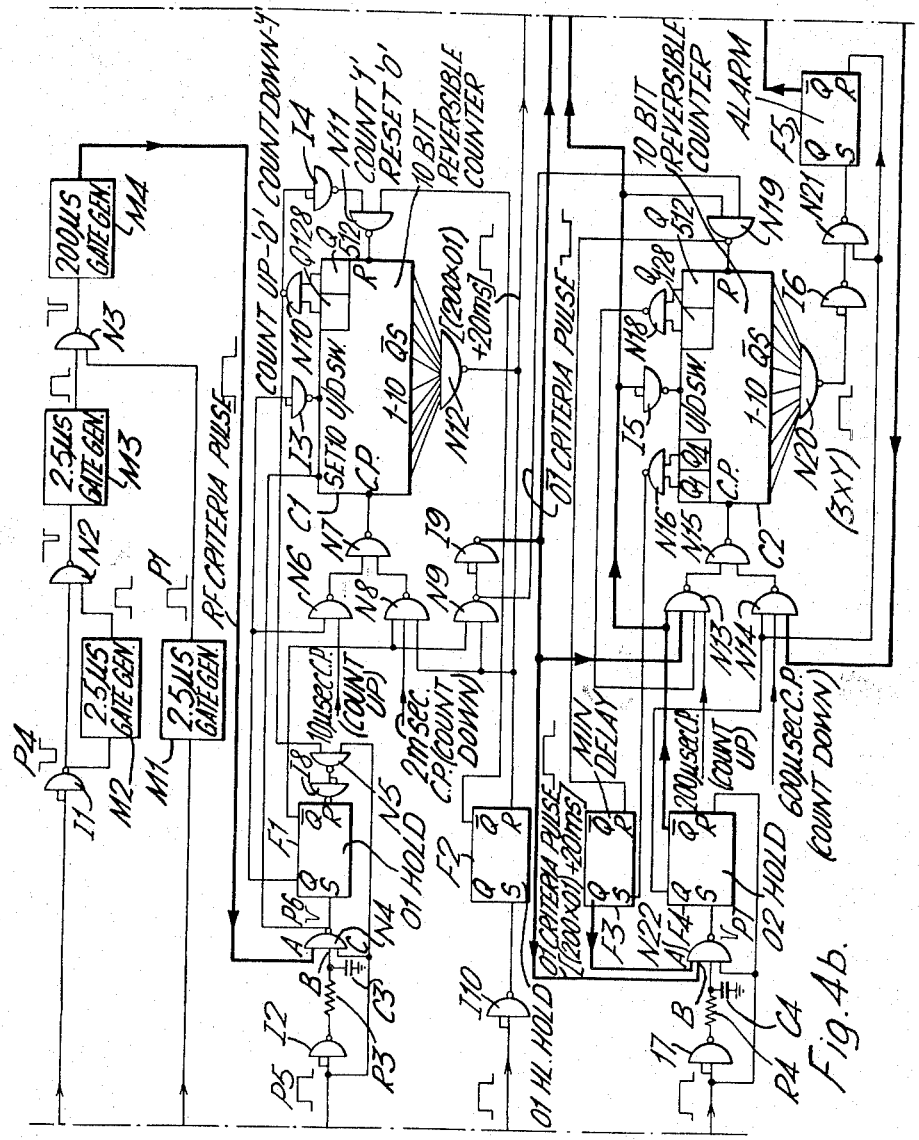
Figure 4C:
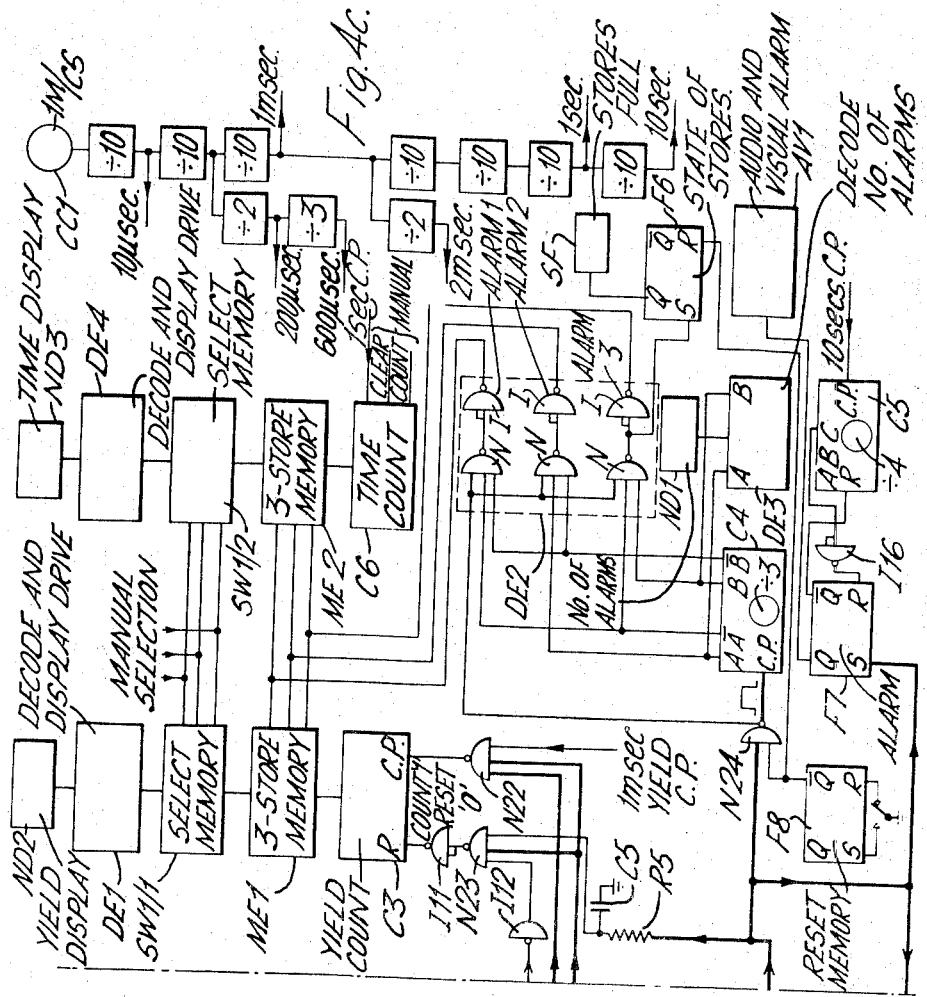

The embodiment shown in FIG. 4 will now be described, but first certain conventions used in the logic will be stated.

Nand gates

These are shown as N1, N2, etc. They are all positive gates, i.e. a positive output represents "1" and a negative output represents "0", and operate in a known manner according to the following truth table:

| Input A | Input B | Output Q |
|---|---|---|
| 0 | 0 | 1 |
| 0 | 1 | 1 |
| 1 | 0 | 1 |
| 1 | 1 | 0 |

Inverters

These are shown as I1, I2 etc. They produce an output of opposite polarity to their input.

Bistable flip-flop etc. outputs

Q = Positive output (ie. normally negative = "0")
$\overline{Q}$ = Negative output (i.e. normally positive = "1")

Miscellaneous

S = Set Q to "1" (from "0")
R = Reset (opposite to S)
CP = Clock pulse input
U/D = Up/Down steer
HOLD = Bistable latch
Y = Back edge of 01 pulse to front edge of 02 pulse Radiofrequency pulse processing channel This channel receives and processes the radiofrequency (RF) pulse to establish whether or not it passes the criteria already stated. The RF pulse is received on a 0.5 meter rod aerial AE1 and fed via a broadband (12 kHz – 5 MHz) attenuator and emitter-follower A1 to an amplitude- discriminating sub-channel consisting of an amplifier A2, an OR gate OR1 and a level detector D1, the latter being a tunnel diode. Amplifier A2 has a rise-time of 50 nsec, a droop of less than 6 percent in 2.5$\mu$ sec and unity gain.

The RF pulse may have either positive or negative polarity. For this reason all amplifiers used in this channel are linear for either polarity pulse. The output of amplifier A2 is therefore arranged to deliver both positive and negative-going pulses which are combined in the linear OR gate OR1 to provide a unidirectional output independent of the polarity of the received signal. This output is fed to a level detector D1 which is set to a threshold of 0.5V corresponding to ±3V/m at the aerial. The resulting pulse from D1 triggers a monostable multivibrator M1 which generates a 2.5 μsec positive gate pulse P1.

The output from A1 is also fed to a rise-time and leading-edge duration criteria sub-channel. This consists of a differentiating amplifier A3, having an effective input time-constant of 22nsec and bipolar level detectors D2 and D3 (which are tunnel diodes), in order to accommodate input pulses of either polarity.

The time-constant and the gains of the two amplifiers A1 and A3 are such that a signal with a rate of rise > 5V/m/μsec will operate one of the two level detectors. A3 has a rise-time of 15 nsec, a droop < 6 percent in 2.5 μsec and a gain of 60.

The outputs from the level detectors D2 and D3 are pulses whose duration is that of the front edge above the given rate of rise, and are fed to a complex of cross-coupled Nand gates N and inverters I identified as CG1. The circuit CG1 ensures that only the initial differentiated detected pulse is passed through to the next stage, without artificial lengthening as may be caused by a signal having a waveshape of triangular form. Under the latter conditions it can be shown level detectors D2 and D3 will both operate, with the result that a valid signal would be rejected by the <2.5 μsec criterion, to be described later. CG1 operates so that receipt of the first valid signal from either D2 or D3 inhibits passage of a signal from the other detector for a period determined by time-constant C1R1 or C2R2.

The outputs from both detectors are connected to a Nand Gate N1 which provides a positive output pulse of duration equal to or slightly greater than the length of that part of the leading edge of the RF pulse which has a rate of rise >5V/m/μsec.

After phase-reversal by I1 to produce a pulse P4, the front edge of the latter triggers a 2.5 μsec monostable multivibrator M2, the output of which is connected to one input of a Nand gate N2. The other input of this gate is fed directly by pulse P4. N2 delivers an output pulse provided the input pulse P4 is shorter than the 2.5 μsec pulse from M2, thus satisfying the 2.5 μsec criterion.

The output pulse from N2 is used to trigger a further 2.5 μsec monostable multivibrator M3 which when in coincidence with the pulse P1 from M1, as determined by Nand gate N3, produces an output pulse which triggers a 200 μsec gate generator M4. The occurrence of a 200 μsec pulse at this stage indicates that all the radiofrequency pulse criteria have been satisfied.

The additional delay of 2.5 μsec introduced by M3 serves to ensure coincidence with P1 when the input signal is only a little above the 3V/m level. It is possible, under these conditions, that D1 will not operate until more than 1 μsec or so after the onset of the accepted rate of rise. Such a situation can arise, for example, when a low-mounted aerial is used, or where the aerial is screened. Where an adequate input signal is obtainable from the aerial, this feature may not be required.

The 01 optical processing channel

The optical signal which is detected by an array of photo-cells SO1 is differentiated by an input transformer T1, and amplified by an amplifier A4 to a sufficient level to operate a level detector D4 which is a Schmitt trigger circuit. The amplifier A4 and preceding circuitry are arranged to deliver an output of 1 volt, for an optical signal having a minimum rate of change appropriate to the smallest weapon under the worst prescribed conditions of range and attenuation viz. 300 mW/cm$^2$.sec. Differentiating transformer T1 has a response time-constant of about 45 μsec, a primary: secondary turns ratio of 1:10, a primary inductance of 3 mH, a primary resistance of <0.5 ohm and a resistor of 75 ohms across the primary winding to provide 1.5 times critical damping of the oscillatory circuit formed by the primary inductance and photo cell self-capitance. Amplifier A4 has a rise-time <4 μsec, a droop <2 percent in 8 msec and a gain of 1600. The output of D4 is fed as pulse P5 to the 01 logic circuitry.

The array SO1 comprises five matched Ferranti MS7B silicon photovoltaic cells connected in parallel and mounted with their sensitive surface in the vertical plane, on the periphery of a horizontal circle, between two horizontal circular plates. As a result of these the cell array has a polar diagram of 360° in the horizontal plane and limited to an included angle of 20° in the vertical plane. This limitation reduces to a minimum interference due to variation in direct sunlight, known as "twinkle". The cell array is mounted below the aerial system AE1. Filters of Chance glass OGR2 and ON22 1 mm thick are mounted in front of the cells to center the optical acceptance band on a wavelength of 0.56 microns with a band-width of 0.05 microns. The cells are arranged to operate in a linear mode over a wide range of light levels by connecting them to a load of very low DC resistance, viz the primary resistance of transformer T1. This ensures that they have the same sensitivity to light transients and to ambient light conditions.

Because of saturation effects under high-level signal conditions, when a pulse-lengthening effect occurs, an alternative high-level channel attenuator AT1 (ratio 10:1) and level detector D5 is also incorporated. D5 detects at a level >300mV referred to T1 primary. The first part of the 01 logic circuit, consisting of inverter I2 and Nand gate N4, ensures that the front edge of the 01 pulse occurs within 200 μsec of the start of the radiofrequency pulse. The combination of the I2,N4, and the 11 μsec time-constant C3R3 forms a front-edge selector circuit for the 01 pulse and operates as follows. Assume that input A to N4 is in the logic "1" state. On receipt of pulse Ps input C assumes logic level "1" and since input B is already at this level, the output from N4 changes to "0". Meanwhile capacitor C3 is being discharged by the pulse from I2, towards level "0". When this state is reached N4 changes state to level "1". Thus, depending on the time-constant C3R3, a negative pulse occurs at the output of N4 coincident in time with the front edge of the input pulse thereto. Furthermore, because the 200 μsec from M4 is applied to the A input of N4, an output from the N4 gate will only be generated when the front edge is coincident with the radiofrequency pulse.

The remainder of the logic circuitry associated with the 01 channel performs the following functions:-
1. It measures the duration of the 01 pulse
2. If the duration is greater than 6.3 msec, and provided no high-level signal has been received, the 01 signal is rejected and the logic system is reset to the initial 'wait' position.

3. At the end of the 01 pulse i.e. at $T1MAX$, a further pulse is generated whose duration is related to that of the 01 pulse as the function $200 \times T1MAX + 20$ msec. This pulse is termed the 01 criteria pulse (see FIG. 3)

4. If a high-level pulse is received, the resetting circuits are inhibited until the end of the 01 criteria pulse, which under these circumstances will be much longer than with a normal pulse.

To perform these logic functions and to generate the pulses indicated above, the components of the 01 sub-system consists of a 10-bit reversible counter C1, Nand gates N5 – N12, and inverters I2 – I4.

Prior to the occurrence of pulse P6 resulting from the coincidence of the RF and 01 pulses at N4, it is convenient to establish the logic states of the various circuit elements as follows:

| Hold flip-flop $F^1$ | State | Nand gates N | Output |
|---|---|---|---|
| $\bar{Q}$ | 1 | 5 | 1 |
| Q | 0 | 6 | 1 |
| S | 1 | 7 | 0 |
| R | 0 | 8 | 1 |
| Reversible Counter C1 | | 9 | 1 |
| All $\bar{Q}$ | 1 | 10 | 1 |
| All Q | 0 | 11 | 1 |
| U/D | 1 | 12 | 0 |
| Reset | 1 | | |
| Set 10 | 1 | | |

The 01 pulse from N4 performs two functions; it sets the Hold flip-flop F1 so that $Q \rightarrow 1$ and $\bar{Q} \rightarrow 0$ and sets up counter C1 to the 10-state such that the subsequent count will start from an apparent time of 100 $\mu$sec.

When $Q \rightarrow 1$, N6 allows 10 $\mu$sec clock pulses to reach the input of the counter C1 via N7, and also sets C1 to the Count-up state via I3. The counter now commences to accumulate pulses at the clock pulse rate.

When the set-to-10 condition of C1 is created, gate N12 changes state from $0 \rightarrow 1$, thus providing the front edge of a 01 zero-detect pulse.

The counter C1 continues to accumulate the 10 $\mu$sec clock pulses until either (a) the end of the 01 pulse or, (b) the number of counts registered reaches 640 which represents a duration of 6.3 msec of the 01 pulse.

At the latter time outputs Q/128 and Q/512 of C1 are both at logic level 1 giving a 0 level output from gate N10 which resets F1 to the original state via N5 and the counter C1 to zero by means of I4 and N11. The 01 signal is therefore rejected as not being derived from an explosion and the circuit remains in the wait condition.

If at the same time a high-level signal had occurred, the flip-flop F2 would have been set from D5 via I10 so that its output $Q \rightarrow 0$ and this would have inhibited the reset of the counter C1 by virtue of gate N11. The mode of operation would then revert to condition (a) above, to be now described.

Under these conditions, on the termination of the 01 pulse P5, F1 is reset by N5 applying level 0 via I8 to input R of F1. The change of state of F1 switches the counter C1 to the Count Down state via I3, inhibits the 10 $\mu$sec clock pulses by means of gate N6, and release gate N8 so that 2 msec clock pulses are fed to the counter via N8 and N7. This latter condition is possible because the third input of N8, from N12, is in the 1 condition.

The counter C1 now commences to count down at the slower rate. At the same time the change in logic levels at the input of N9 creates at its output the negative front edge of the 01 criteria pulse. The count down continues until the counter has subtracted all the registered counts, at which stage the zero detect gate N12 changes state at its output and returns to level 0. This results in the 2 msec clock pulses being inhibited by N8 and terminating the 01 criteria pulse from N9. The length of this pulse will be $200 \times T1_{MAX} + 20$ msec. The fixed 20msec time is the result of the C1 Up count starting from 10, not zero. The multiplier is 200 and not 201 is because the front edge of this pulse is initiated from the back edge of the 01 pulse. An inverted form of this pulse is produced by I9.

The fixed 20 msec component of the 01 criteria pulse corresponds to a minimum duration of 100 $\mu$sec in the 01 pulse P5 from D4. With a low-yield explosion, say <2 kT, the correlation between the length of the P5 and the received optical signal may be lost, because, for example, the rise-time of the latter is too fast for the input circuitry. To avoid loss of genuine alarms, it is therefore arranged, as described, that any input signal which operates D4 is subsequently treated as giving rise to an output pulse from D4 which is at least 100 $\mu$sec long, i.e. corresponding approximately to a 2 kT explosion.

The multiplier 200 gives a safety factor of 2 in the $T1_{MAX}$ : $T_{MIN}$ ratio.

The 02 optical processing channel

The 02 channel responds to the slower rates of rise associated with the second optical maximum and the first minimum. In a similar manner to the 01 channel, detection of the 02 pulse is carried out by photo-cells S02, a differentiating transformer T2 and amplifier A5. Differentiating transformer T2 has a response time-constant of about 0.6 msec, a primary: secondary turns ratio of 1:10, a primary inductance of 0.5H, a primary resistance <4 ohms and a resistor of 820 ohms across the primary to effect critical damping. Amplifier A5 has a rise-time of 0.45 msec, a droop < 1 percent in 80 msec and a gain of 5,000. Again a 1V level is detected by level detector D6 with the minimum rate of rise for which the equipment is designed viz. 1.8 mW/cm$^2$.sec. The SO2 array comprises five cells of the type used in the 01 channel and similarly mounted. The low resistance of T2 primary again ensures linear mode operation.

The logic circuitry of the 02 channel checks that the following criteria are satisfied:

1. The start of the 02 pulse occurs within the duration of the 01 criteria pulse but not within 1 msec of the start of the 01 criteria pulse.
2. The 02 pulse persists for longer than 3 times the time to $T_{MIN}$ or longer than 384 msec.
3. It also generates an alarm pulse if the criteria are satisfied.

The first stage of the 02 logic circuit consisting of I7 and N22 forms with time-constant C4R4 (11 ($\mu$sec) a front-edge selector in the same manner as described for the 01 circuit. In this case there are two inputs A and B to gate N22 whose states must be suitable. Input B is fed by the 01 criteria pulse so that the front edge of the 02 pulse must occur in coincidence with this pulse; and input A, which is derived from a minimum delay flip-flop F3, must also be at level 1 before the front edge appears at the output of N22 as a short negative pulse P7.

The remainder of the logic circuitry consists of flip-flops F3 and F4, Nand gates N13–N21, inverters I5 and I6, and a 10-bit reversible counter C2.

The initial conditions of the logic components of the 02 channel are as follows:

| Minimum delay flip-flop F3 | | Hold flip-flop F4 | | Alarm flip-flop F5 | |
|---|---|---|---|---|---|
| Q | 0 | Q | 0 | Q | 0 |
| Q̄ | 1 | Q̄ | 1 | Q̄ | 1 |
| S | 1 | S | 1 | S | 1 |
| R | 0 | R | 0 | R | 0 |

| Nand gates | Output | | |
|---|---|---|---|
| 13 | 1 | Reversible Counter C2 | |
| 14 | 1 | All Q | 0 |
| 15 | 0 | Q̄ | 1 |
| 16 | 1 | R | 0 |
| 18 | 1 | CP | 0 |
| 19 | 0 | U/DSW | 0 up count |
| 20 | 0 | | |
| 21 | 1 | | |

On the generation of an 01 criteria pulse, which is applied to gate N13 enabling 200 μsec clock pulses to be fed to counter C2 via N15, the counter will commence to accumulate pulses. When the first 5 pulses have been accumulated, Q/1 and Q/4 of C2 will change to level 1 thus providing a 0 output from N16 which sets flip-flop F3 so that Q → 1. This change occurs 1 msec after the commencement of the 01 criteria pulse which enables gate N22 to provide an output pulse P7 coincident with the front edge of 02 as mentioned earlier. This part of the circuit has therefore established two criteria, viz. that the start of the 02 pulse occurs within the duration of the 01 criteria pulse, but not earlier than 1 ms after the commencement of this pulse.

The new pulse P7 generated by gate N22 constitutes the start of the 02 pulse, and is applied to the set of hold circuit F4, which changes state Q → 1 and Q̄ → 0. Immediately this change of state occurs, the 200 μsec clock pulses are inhibited by gate N13, counter C2 is changed from the Count Up state to the Count Down state via I5, and gate N14 is enabled to transfer 600 μsec clock pulses to the counter via N15. The counter commences to count down at the slower rate.

If on the Up Count the accumulated number had reached 640, representing a time of 128 msec (i.e. 384 msec divided by 3), Q/128 and Q/512 would have changed to level 1 causing N18 to change to logic level 0 which in turn inhibits the 200 μsec clock pulses by gate N13. The counter C2 is held in this wait condition until the Count Down process is initiated.

The counting down continues until the counter reaches the zero condition at which point all the Q̄ outputs of C2 return to 1, producing a 0 output from gate N20. This output is applied via inverter I6 and gate N21 which is in the prepared state, to the set input of an alarm flip-flop F5, which changes state Q̄ → 0, and is also applied to N14 inhibiting the 600 μsec clock pulses. The operation of F5 indicates that all the criteria have been met and that the detected signals are from a nuclear explosion.

If at any time during the count-down process the 02 pulse ends prematurally, the 02 channel is reset to the initial state and the signal rejected as a potential alarm, because Q of F4 returns to 0 and inhibits N21.

At the end of the 02 pulse F4 and F5 are reset to the initial state. C2 and F3 are reset to zero by the back edge of the 02 pulse or of the 01 criteria pulse, whichever is the later. Normally this will be done by the 02 pulse, but under false-alarm conditions it will normally be done by the criteria pulse.

The effective multiplication of $T$MIN in C2 by a factor 3 rather than by a factor 10, as might be suggested by FIG. 2, is a safety measure to take account of the fact that the 02:$T$MIN ratio may be less than 10:1 with some explosions.

Yield measurement, storage and alarm

Yield is measured by measuring the time T between the back edge of the 01 pulse ($T^1$MAX) and the commencement of the 02 pulse at $T$MIN. The yield in kilotons is then given by $W=0.349T^{2.25}$, where $T$ is in msecs. $T$ is the time-interval between the start of the 01 criteria pulse and the start of the 02 hold pulse from F4. The measurement is made by the Nand gates N22 and N23 and the binary-coded decimal counter C3.

On receipt of the pulse from N12 via I12, gate N23 applies a '1' to the reset input of counter C3, which is thereby changed from the reset to the Count condition. C3 is thereby readied to receive 1 msec clock pulses via gate N22, which is enabled to pass them by receipt of the 01 criteria pulse from I9. The count continues until this gate is inhibited by the 02 hold pulse from Q̄ of F4 at the commencement of the 02 signal. The time is therefore held for a short time in the C3 counter, until the confirmed alarm stage is reached.

When a genuine alarm is indicated by operation of F5, the information contained in the yield counter C3 is transferred to one of three permanent stores of memory ME1. A short time after this transfer determined by time-constant C5R5 (4.4 μsec), the yield counter C3 is reset to zero by the alarm-hold output Q̄ of F4 via gate N23 and I11.

The alarm output from F4 not only transfers the count to ME1 but also directs the information to the appropriate store of the three thereof and gives an indication of the number of alarms. This number has a maximum value of three, at which time a "stores full" indication is displayed. The system is so arranged that in the event of more than three alarms, information relating to the last three occurrences is registered.

The logic circuitry controlling the transfers and the registration of the state of the stores comprises a divide-by-3 counter C4, decoders DE2 and DE3, flip-flop F6 and gate N24. The alarm state 0 level from F5 is applied to the counter C4. The output of this counter is decoded by DE2, comprising three Nand gates N and three inverters I connected as shown, and applied to the latch memory circuit ME1. It is arranged that the first alarm pulse transfers the information to store 1 of ME1, the second to store 2 and the third to store 3 thereof. A further decoder DE3 also takes the information from C4 and presents a numerical display of the number of alarms received at ND1. On the receipt of 3 alarm pulses, a flip-flop F6 is set by an output from DE2 which gives a visual indication of "stores full" at SF.

An audible and visual alarm is also produced for each event on unit AV1 by means of flip-flop F7, counter C5 and I16. These circuits produce a 30 sec audible note, the timing being from a 10 sec clock pulse.

A manually-controlled reset memory flip-flip F8 is provided to clear the stores to an initial zero condition upon switching on the apparatus.

Read out

In order to read out the information contained in any one store of ME1 a manual switch SW1/1 selects the appropriate store and the information is decoded by DE1 and transferred to a decimal numerical display ND2. The information contained within ME1 is not destroyed by transfer and remains available for further reference.

Time of recorded alarms

The system incorporates an accurate digital clock comprising a binary-coded decimal counter C6 which records 1sec clock pulses. When an alarm occurs the time of this event is transferred into one store of a three-store memory ME2 in the same manner as the yield is recorded. On manual selection of a specific store of ME2 by SW1/2, the time of the alarm is displayed numerically on ND3 via decoder DE4. Thus both the yield and the time of the alarm are displayed simultaneously.

The various clock pulses are obtained from a 1Mc/s crystal-controlled clock CG1 and the subsequent pulse-divider chain shown. T Performance It is estimated that, with the described embodiment, the detection and recognition probability for a minimum range of 100 km is in excess of 90 percent for all weather conditions typical of northern Europe. The measurable yield values range from 3 kT to 10 MT and have a 95 percent probability of being within ± 45 percent of the true value (± 25 percent if the explosion is known to be atmospheric or ground). The low end of the range is set by the input sensitivity and by the criterion that the time between $^{T1}$MAX and $^{I}$MIN must exceed 1 msec. The high end of the range is set by the criterion that the time to $^{T1}$MAX must not exceed 6.3 msec (which value includes a tolerance for the uncertainty to the time of $^{T1}$MAX). The high end of the range can be increased to 30 MT by increasing the latter time to 8 msec, the output to gate N10 being modified accordingly.

The false alarm rate is estimated at a few tens per annum and will occur during clearly apparent local thunderstorms. If several devices are spaced at more than 30 km (beyond the range of local thunderstorm effects) and only those alarms occuring co-incidentally at several locations are treated as true alarms, the number of false alarms will be unlikely to exceed one per annum.

The embodiment will also detect and recognize atomic explosions from 3 kT down to the sub-kT region with some loss of system sensitivity and with some uncertainty ( to a factor of a few times) in the calculated value of such yields.

The circuits reset rapidly after responding to input signals, false or genuine.

It will be understood that the invention is not limited to the details of the described embodiment, including the particular values of amplitudes, time-durations, multiples, etc used. The latter may be altered according to the required performance, particularly the permissible false-alarm rate. The use of digital circuitry, particularly counters C1 and C2, simplifies such modifications but is not an essential feature of the invention.

Other Embodiments of the Invention

The principle of comparing the durations of different parts of the transient optical signal can be used in other arrangements than that of the above-described embodiment. For example another 01 optical criterion can be included, in furtherance of a low false-alarm rate, by checking that the time-interval $^{T1}$MAX → $^{T}$MIN is not less than a given multiple of the time-interval 0 → $^{T1}$MAX. A suitable value of multiple is × 25. Thus, referring to FIG. 3, the criterion is that G-H duration >25 × F-G duration. This criterion can be checked by using a reversible counter and clock pulses of different repetition frequencies as already described.

The above comparison may be additional to the comparisons effected in the preferred embodiment, or may be substituted for the check on the duration of the 02 pulse, K in FIG. 3. In the latter case the 02 optical processing channel can be omitted altogether. The occurrence of $^{T}$MIN can then be detected by a level detector which detects when the slope of portion L in FIG. 2 falls below a threshold value. This means for detecting $^{T}$MIN (H in FIG. 3) can also be substituted for detecting when the slope of portion E exceeds a threshold value by means of D6 can the preferred embodiment.

The comparison of the durations of different parts of the optical signal can be effected by means other than a reversible counter. For example a given multiple of the duration of one part of the signal can be derived by charging a capacitor during that part with a first time-constant and discharging it with a second time-constant which is the given multiple of the first.

We claim:

1. A nuclear explosion detection system comprising means for receiving the transient radiofrequency signal radiated from the explosion, means for deriving from said radiofrequency signal a first output pulse if its rate of rise exceeds a predetermined value, its duration is less than a predetermined time and its field-strength exceeds a predetermined level, means for receiving the fast- and slow-rising portions of the transient optical signal radiated from the explosion and converting them to electrical signals, means for deriving from said fast-rising portion a second output pulse if its rate of rise exceeds a first predetermined value, means for deriving from said slow-rising portion a third output pulse if its rate of rise exceeds a predetermined value, and means for causing the occurrence of said first, second and third output pulses to indicate a nuclear explosion provided that:

a. said second pulse occurs within a predetermined time of said first pulse, b. said second pulse does not exceed a predetermined duration unless the rate of rise exceeds a second rate of rise greater than said first rate of rise, c. said third pulse commences more than a predetermined time after the end of said second pulse but less than a time thereafter which exceeds the duration of said second pulse, d. said third pulse has a duration which exceeds the time between the end of the second pulse and the commencement of the third pulse.

2. A system as claimed in claim 1 wherein in proviso (c) said time thereafter which exceeds the duration of said second pulse is a function comprising a multiple of the duration of said second pulse.

3. A system as claimed in claim 2 wherein said function includes a fixed time.

4. A system as claimed in claim 1 wherein in proviso (d) said duration is either a time which is a function comprising a multiple of the time between the end of the second and the commencement of the third pulse or a predetermined time, whichever is the lesser.

5. A system as claimed in claim 1 wherein the first output pulse is only derived if said predetermined field strength level is reached within a predetermined time of the predetermined rate of rise and duration.

6. A nuclear explosion detection system including means for receiving the radiated transient optical signal, means for receiving the radiated transient radiofrequency signal, and means whereby the occurrence of an explosion cannot be indicated unless the radiofrequency signal and the optical frequency signal satisfies selected criteria , said system comprising means for deriving at least one time-interval which includes a multiple of the duration of a given part of the optical signal, and means for comparing the duration of another part of the optical signal with said time-interval.

7. A system as claimed in claim 6 comprising means for receiving both the fast-rising and the slow-rising portions of the optical signal and means for indicating the occurrence of an explosion if said radiofrequency signal and both said optical portions satisfy selected criteria.

8. A system as claimed in claim 7 comprising time-interval deriving means arranged to derive a first time-interval which includes a multiple of the time to the first optical maximum, and a second time-interval which includes a multiple of the time to the first optical minimum, the comparing means being arranged to substantially compare the time to the first optical minimum with said first derived time-interval and to compare the time between the first optical minimum and the second optical maximum with said second derived time-interval.

9. A system as claimed in claim 8 wherein said first time-interval also includes a fixed time.

10. A system as claimed in claims 8 wherein an explosion cannot be indicated unless substantially the time to the first optical minimum is less than said first time-interval.

11. A system as claimed in claim 10 wherein an explosion cannot be indicated unless the time between the first optical minimum and the second optical maximum exceeds said second derived time-interval or a fixed time, whichever is the lesser.

12. A system as claimed in claim 8 wherein the means for deriving a time-interval which is a multiple of the duration of a given part of the optical pulse comprises a reversible counter, means for feeding clock pulses at one repetition frequency to the counter during the given duration in one direction, and means for subsequently feeding clock pulses at a sub-multiple of said repetition frequency to the counter in the reverse direction to return the counter to a predetermined condition.

13. A system as claimed in claim 6 comprising means for deriving a time-interval which includes a multiple of the time to the first optical maximum, means for comparing said time-interval with substantially the time to the first optical minimum, and means whereby an explosion cannot be indicated unless the time to the first optical minimum is less than said time-interval.

14. A system as claimed in claim 13 wherein said time-interval also includes a fixed time.

15. A system as claimed in claim 6 comprising means for deriving a time-interval which includes a multiple of the time to the first optical maximum, means for comparing said time-interval with substantially the time to the first optical minimum, and means whereby an explosion cannot be indicated unless substantially the time to the first optical minimum exceeds said time-interval.

16. A system as claimed in claim 6 wherein the means for deriving a time-interval which is a multiple of the duration of a given part of the optical pulse comprises a reversible counter, means for feeding clock pulses at one repetition frequency during the given duration in one direction, and means for subsequently feeding clock pulses at a sub-multiple of said repetition frequency to the counter in the reverse direction to return the counter to a predetermined condition.

17. A system as claimed in claim 6 wherein the means for deriving a time-interval which is a multiple of the duration of a given part of the optical pulse comprises a capacitor arranged to be charged with a first time-constant during that part of the pulse and to be subsequently discharged with a second time-constant which is the given multiple of the first time-constant.

* * * * *